Figure 1A:
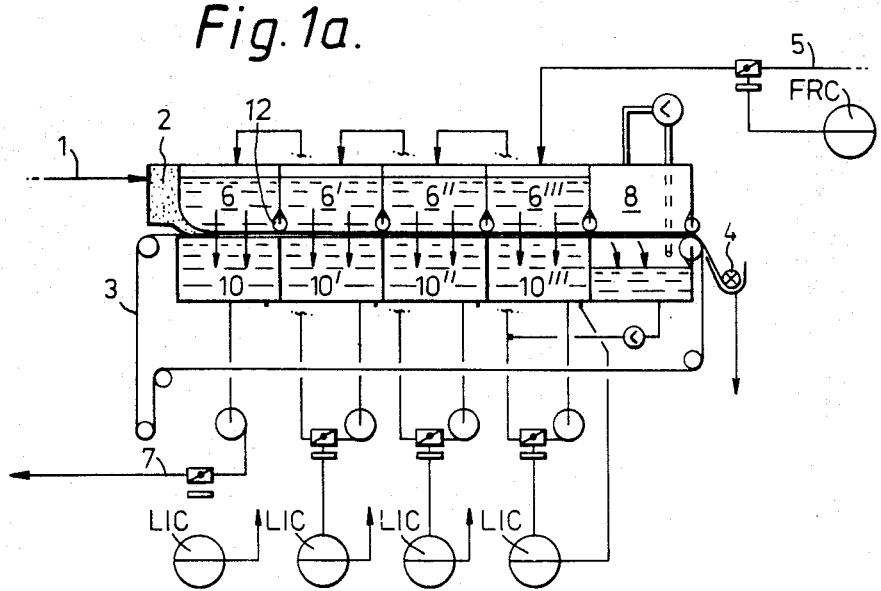

United States Patent [19]

Haapamäki et al.

[11] Patent Number: 4,664,749
[45] Date of Patent: May 12, 1987

[54] METHOD OF WASHING CELLULOSIC PULP SUBMERGED IN WASHING LIQUID

[75] Inventors: Pertti Haapamäki, Montreal, Canada; Alpo Tuomi, Pori, Finland

[73] Assignee: Rauma-Repola Oy, Pori, Finland

[21] Appl. No.: 628,445

[22] Filed: Jul. 6, 1984

[30] Foreign Application Priority Data

Sep. 12, 1983 [FI] Finland ................................ 833247

[51] Int. Cl.$^4$ .............................................. D21C 9/02
[52] U.S. Cl. ....................................... 162/56; 68/158; 68/181 R; 162/60
[58] Field of Search ..................... 162/60, 19, 317, 56, 162/380, 297, 205, 115, 63, 65, 18; 68/181 R, 156; 8/156

[56] References Cited

U.S. PATENT DOCUMENTS

| | | | |
|---|---|---|---|
| 2,995,186 | 8/1961 | Montigny | 162/317 |
| 3,236,724 | 2/1966 | Wahlström | 162/317 |
| 3,938,206 | 2/1976 | Strasger-Johannessen | 162/60 |
| 4,046,621 | 9/1977 | Sexton | 162/60 |
| 4,549,415 | 10/1985 | Justus | 162/60 |

Primary Examiner—Steve Alvo
Attorney, Agent, or Firm—Burns, Doane, Swecker & Mathis

[57] ABSTRACT

Method for the washing of chemical pulp (1) by means of a fourdrinier wire machine in two or more stages (6,10; 6',10'; 6", 10"; 6''', 10''') while the pulp web runs on the wire (3). The liquid contained in the pulp web is displaced by a washing liquid. The pulp web and the wire (3) run, during the washing, as submerged in the washing liquid while the washing liquid flows through the pulp web and the wire. One embodiment comprises passing the washing liquid upwardly through the pulp and then downwardly through the pulp.

3 Claims, 5 Drawing Figures

METHOD OF WASHING CELLULOSIC PULP SUBMERGED IN WASHING LIQUID

The present invention is concerned with a method for the washing of cellulosic pulp by means of a belt wire washer in two or more states while the pulp web runs on the wire, whereat the liquid contained in the pulp web is displaced by a washing liquid. The invention is also concerned with equipment for the application of the method, which said equipment comprises an endless wire and means for conveying the wire as well as means for passing the pulp onto the wire.

In the prior-art horizontal wire washers, for displacing the liquid contained in the web by means of washing liquid, in the washing stage proper, either pressurized air above the wire, suction (air) underneath the wire, or a combination thereof is used.

These prior-art washers involve the following drawbacks:

In order to produce air pressure or suction, equipment is required which consumes energy.

When air is mixed into the pulp suspension, it causes foaming in alkaline liquids, which again deteriorates the displacement of the washing liquids.

When suction is used, the washing cannot be performed at the temperature of the boiling point (100° C).

Difficulties of sealing the equipment, in particular when sulphur-containing gases are circulated (e.g. the sulfite process).

The object of the present invention is to eliminate the above drawbacks. The method in accordance with the invention is mainly characterized in that the pulp web and the wire run, during the washing, as submerged in the washing liquid while the washing liquid flows through the pulp web and the wire. The equipment in accordance with the invention is characterized in that, above the wire, the equipment comprises two or more bottomless washing-water basins one after the other as well as means for passing the washing water into the basins, and, underneath the wire, a second set of basins for collecting the washing water from the basins placed above the wire, as well as means for passing the washing water out of the basins placed underneath the wire.

In the method in accordance with the invention the pulp web passes on the wire fabric completely inside liquid so that there is liquid both above and underneath the pulp web.

The liquid contained in the web is displaced with washing liquid by means of the flow of the liquid. The liquid is displaced uniformly within the area of the entire washing stage, permitting a slow rate of flow of the washing liquid.

The washing submerged in liquid can be achieved by means of two different embodiments: either by means of a single-wire machine, in which case the flow of the liquid takes place through the wire always from the top downwards, or by means of a two-wire machine, in which case the flow of the liquid back and forth is also possible.

The method in accordance with the invention has at least the following advantages:

requirements of pumping of liquids and of electric energy are little,
washing process in an air-free space,
separate filtrate tanks are not required,
permits washing at the boiling point,
little strain on the wire owing to the submerged washing,
very simple instrumentation,
reliable in operation, no possibility of running it so that it is blocked.

Figure 1B:
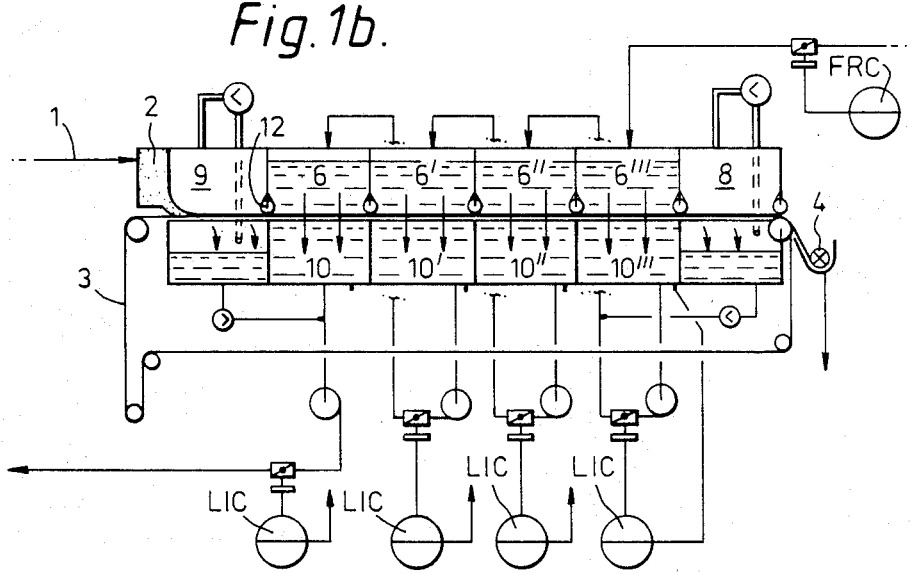
Figure 2A:
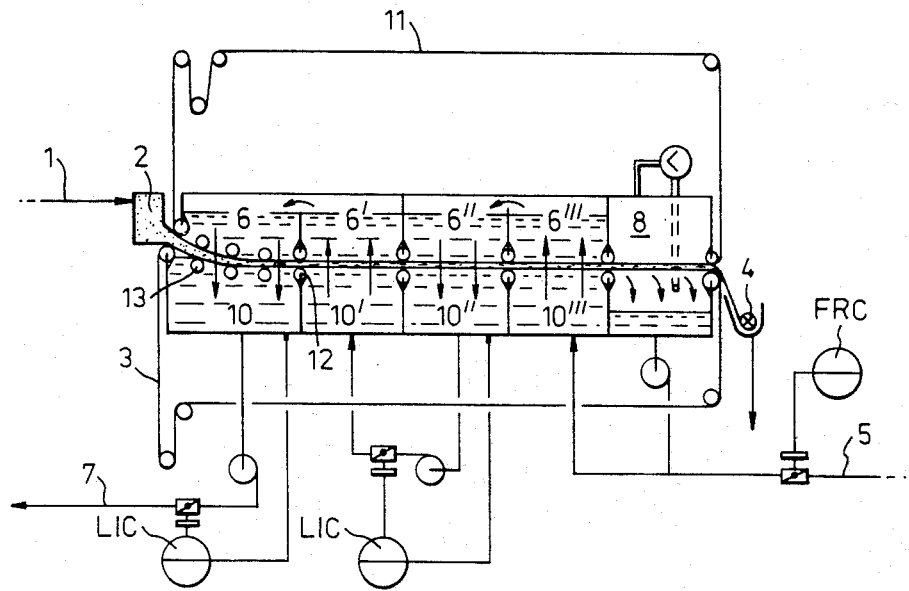
Figure 2B:
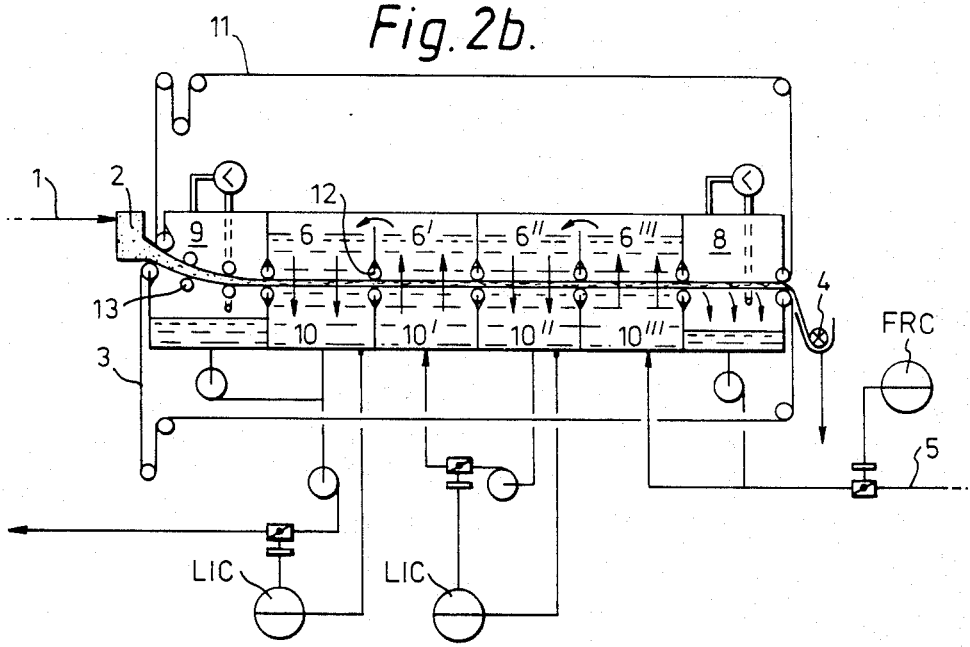
Figure 3:
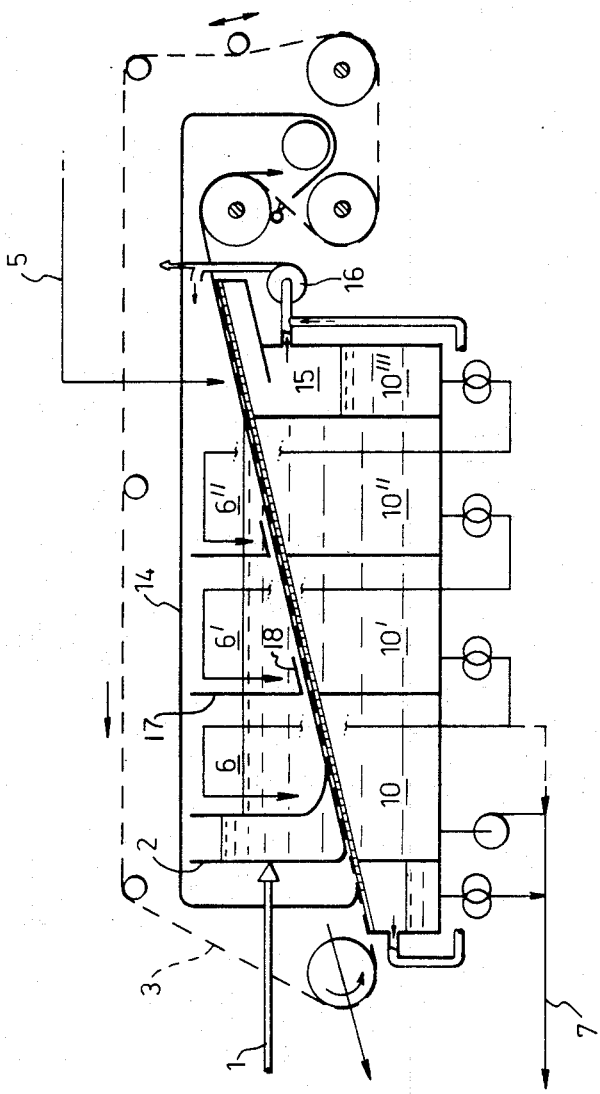

The invention and its details will be described in more detail in the following with reference to the attached drawings, wherein FIG. 1a is a schematical sectional side view of a single-wire washer in which the method in accordance with the invention is applied, FIG. 1b is a schematical sectional side view of an alternative solution for the application of the invention by means of a single-wire washer, FIG. 2a is a schematical sectional side view of a two-wire washer in which the method in accordance with the invention is applied, FIG. 2b is a schematical sectional side view of an alternative solution for the application of the invention by means of a two-wire washer, and FIG. 3 is a schematical side view of a further solution for the application of the invention by means of a single-wire washer.

The equipment in accordance with FIG. 1a has an endless wire 3. At the initial end of the wire, there is a so-called head box 2, and at the final end the removing screw 4. Above the wire, there are several bottomless washing water basins 6, 6', 6'' and 6''' placed one after the other. The vertical walls between the basins can be sealed against the pulp web running on the wire 3, e.g., by means of revolving rolls 12. Underneath the basins 6, there are basins 10, 10', 10'', and 10'''. After the last washing water basin, there is a space 8 with positive pressure above the wire. The equipment is provided with a pipe connection 5 for passing the washing water into the last washing water basin as well as with a pipe connection 7 for passing the washing water from the first basin 10 placed underneath the wire to the evaporating plant. Moreover, the equipment is provided with pipe connections for passing the washing water from each basin 10 placed underneath the wire to the basin 6 of the preceding washing stage placed above the wire. Moreover, the equipment is provided with necessary pumps and flow-control means.

The forming of the web is produced by means of the shaping of the head box, whereat the submerged washing starts immediately after the head box.

The pulp 1, which is introduced into the head box 2 at the pumping consistency (about 3%), sediments at the pumping pressure underneath the profile bar of the head box onto the endless wire 3, and runs on the wire through the entire washer, and is finally removed onto the removing screw 4.

The washing water 5 is passed to the last washing stage 6''' in the washing zone 6, wherein it displaces the web liquid that had remained in the pulp web in the preceding stage, out of the pulp web. The displaced web liquid and the excess washing water are pumped out of the basin 10''' into the preceding washing stage 6'', where the corresponding displacing takes place while the liquid passing upstream is being all the time concentrated. By means of the liquid level adjusters, the basins 10 and 6 are kept all the time filled with liquid, whereat the wire and the pulp web run all the time inside liquid.

The concentrated liquid is finally passed to the evaporating plant 7.

If it is desirable to increase the consistency of the pulp web after the washing zone, as the last stage of the washer it is possible to use, e.g., a space 8 with positive pressure, whereat the liquid coming from this thickening is passed to among the liquid coming from the basin 10''', or, instead of pressure, it is possible to use, e.g., roll or wire presses.

The embodiment shown in FIG. 1b is in the other respects similar to that shown in FIG. 1a, but after the head box, before the first washing stage, the equipment is provided with a space 9 with positive pressure. The web formation and the thickening take place by means of pressurized air at 9 before the beginning of the washing zone proper.

In the embodiment in accordance with FIG. 2a, there is an additional second endless wire 11 above the wire 3. The pulp 1 is introduced at the pumping consistency (about 3%) into the head box 2, from where it is passed to between the two wires 3 and 11. The sedimentation takes place partly by the effect of the pumping pressure, partly owing to the narrowing of the space between the wires, and owing to the flow of the washing liquid. The guiding of the wires takes place by means of rolls 12 and of rolls 13 placed at the initial end.

The pulp is carried between the wires 3 and 11, being finally removed onto the removing screw 4.

The washing water 5 is passed to the last stage 10''' of the washing zone, from where it passes upstream through the pulp web alternatingly upwards and downwards, being finally removed as concentrated to the evaporating plant 7.

After the washing zone 8, e.g., pressurized air is used for increasing the consistency of the pulp. The liquid from the thickening is passed to among the washing liquid into the basin 10'''.

The embodiment shown in FIG. 2b is in the other respects similar to that shown in FIG. 2a, but before the first washing stage, there is a space 9 with positive pressure in the equipment. The thickening of the pulp web takes place before the washing stage proper, e.g., by means of pressurized air.

In the embodiment shown in FIG. 3, the wire carrying the pulp web runs back to the initial end of the washer above the basins. In such a case, the supporting of the entire equipment is considerably easier than when the wire runs back underneath the basins.

A hood 14 is fitted above the basins 6, which hood is connected with the open air.

After the washing performed between the basins 6'' and 10'' in the liquid phase, in the embodiment shown in FIG. 3, the last washing stage takes place in a gas phase. In the last basin 10''' the liquid level is kept so low that there is a gas space 15 in the top portion of the basin underneath the wire. In the space 15, a negative pressure is maintained by means of a blower 16 connected to the space. The blower blows part of the gas sucked out of the space 15 to underneath the hood 14, and part of it elsewhere. There is a constant slight negative pressure under the hood. Threat, detrimental gases are not carried to the open air.

The wire portion that carries the pulp web is in an inclined position so that it rises towards the final end of the washer.

Above the gas space 15, washing liquid is sprayed onto the wire, and it is carried through the wire, by the effect of the suction prevailing in the space 15, into the basin 10'''. In this way, the liquid of the last washing stage can be removed out of the pulp efficiently. Since the pulp has already passed through several washing stages, foaming no longer takes place even if the last washing is carried out in a gas phase.

In the solution in accordance with FIG. 3, the lower ends of the partition walls 17 between the basins 6 are not sealed against the wire, but they are fitted at a distance from the wire and from the pulp web placed on the wire. The bottom ends of the partition walls 17 are provided with sheets 18 projecting in the direction of running of the wire, the said sheets being placed at a distance from the wire and from the pulp web. In the solution in accordance with FIGS. 1 and 2, the rolls 12 may press the pulp web against the wire so that the wire is blocked. When there is a space between the vertical walls and the wire, there is no risk of blocking. In this case, there is no friction against the wire either. The space between the sheet 18 and the wire is preferably adjustable. The liquid flows, which are maintained by means of pumps, cause that the division line between liquids of different concentrations and between two adjoining basins 6 is placed underneath the sheet 18, so that the liquids contained in the basins are not mixed, in spite of the space.

What is claimed is:

1. A method for washing chemical pulp by means of a belt wire washer, comprising the steps of:
   providing an endless wire conveyor;
   providing a second endless wire conveyor;
   providing a plurality of upper discrete, bottomless compartmented washing basins;
   providing a plurality of lower discrete basins directly below said upper basins, each lower basin being aligned within an upper basin to constitute a washing stage;
   providing a source of washing liquid for said basins;
   disposing a pulp web between the two endless wire conveyors;
   moving the wire conveyor and pulp web sequentially through said upper and lower basins; and
   passing washing liquid up through the pulp web from alternating lower basins and passing washing liquid down through the pulp to the remaining lower basins, wherein the pulp web and wire conveyors are submerged in the washing liquid while the washing liquid flows through the pulp web and wire conveyors.

2. The method as set forth in claim 1, and further comprising the step of passing the pulp web through an enclosure provided with gas.

3. The method as set forth in claim 1, and further comprising the step of subjecting the pulp web to pressured gas to thicken said pulp web prior to moving the pulp web through a first washing stage.

* * * * *